(12) United States Patent
Aoyama et al.

(10) Patent No.: US 7,594,467 B2
(45) Date of Patent: Sep. 29, 2009

(54) INTERNAL COMBUSTION ENGINE WITH IMPROVED THERMAL EFFICIENCY

(75) Inventors: Shunichi Aoyama, Yokosuka (JP); Kenshi Ushijima, Kamakura (JP); Katsuya Moteki, Tokyo (JP)

(73) Assignee: Nissan Motor Co., Ltd., Yokohama (JP)

( * ) Notice: Subject to any disclaimer, the term of this patent is extended or adjusted under 35 U.S.C. 154(b) by 269 days.

(21) Appl. No.: 11/680,468

(22) Filed: Feb. 28, 2007

(65) Prior Publication Data

US 2007/0204747 A1  Sep. 6, 2007

(30) Foreign Application Priority Data

Mar. 1, 2006 (JP) ............................. 2006-054590

(51) Int. Cl.
 *F02F 3/00* (2006.01)
 *B22D 19/08* (2006.01)
(52) U.S. Cl. .................. 92/212; 92/222; 29/888.061
(58) Field of Classification Search ................ 92/171.1, 92/212, 222; 29/888.061
See application file for complete search history.

(56) References Cited

U.S. PATENT DOCUMENTS

| | | | | | |
|---|---|---|---|---|---|
| 3,583,713 | A | * | 6/1971 | Sugahara | 277/444 |
| 3,667,443 | A | * | 6/1972 | Currie et al. | 123/193.6 |
| 4,495,684 | A | * | 1/1985 | Sander et al. | 29/888.045 |
| 4,746,582 | A | * | 5/1988 | Tsuno | 428/627 |
| 4,921,734 | A | * | 5/1990 | Thorpe et al. | 428/34.4 |
| 5,092,289 | A | * | 3/1992 | Bloschies et al. | 123/193.6 |
| 5,144,885 | A | * | 9/1992 | Suzuki et al. | 92/222 |
| 5,174,193 | A | * | 12/1992 | Parker et al. | 92/212 |
| 5,282,411 | A | * | 2/1994 | Hirai et al. | 92/176 |
| 5,425,306 | A | * | 6/1995 | Binford | 92/222 |
| 6,032,570 | A | * | 3/2000 | Koike et al. | 92/222 |
| 6,769,404 | B2 | * | 8/2004 | Aoyama et al. | 123/406.29 |

FOREIGN PATENT DOCUMENTS

JP  H04-104148 U  9/1992
JP  H05-077027 A  3/1993

OTHER PUBLICATIONS

Shigeo Seikyama, Hideo Kawamura, Hiroshi Matsuoka, and Akira Higashino; Combustion and Combustion Chamber for a Low Hear Rejection Engine; A lecture article for the 73$^{rd}$ JSME Spring Annual Meeting, Apr. 1996; pp. 589 and 590; No. 96-1; Japan Mechanical Engineering Academic Society; Japan.

* cited by examiner

*Primary Examiner*—Thomas E Lazo
(74) *Attorney, Agent, or Firm*—Global IP Counselors, LLP

(57) ABSTRACT

An internal combustion engine includes a piston adapted to reciprocate in a cylinder. The piston includes a first portion, a second portion, and a third portion. The first portion of the piston forms a crown surface of the piston, the second portion of the piston forms a piston ring groove of the piston with the piston ring groove arranged and configured to receive a piston ring, and the third portion of the piston forms a crankcase side surface of the piston with the crankcase side surface facing a crankcase of the engine. The second portion of the piston is formed of a material having a higher thermal conductivity than a material forming the first portion of the piston and a material forming a third portion of the piston.

14 Claims, 10 Drawing Sheets

FIG.1

FIG.2A
POSITION FOR HIGH COMPRESSION RATIO

FIG.2B
POSITION FOR LOW COMPRESSION RATIO

FIG.8A
WHEN HIGH IN HEAT INSULATOR TEMP.

FIG.8B
WHEN LOW IN HEAT INSULATOR TEMP.

INTERNAL COMBUSTION ENGINE WITH IMPROVED THERMAL EFFICIENCY

FIELD OF THE INVENTION

The present invention generally relates to an internal combustion engine and, more particularly, to an internal combustion engine with improved thermal efficiency.

BACKGROUND OF THE INVENTION

Internal combustion engines are commonplace in society, especially, for example, in automobiles. A typical internal combustion engine works by filling a combustion chamber in an engine with air and gasoline, compressing the air and gasoline, igniting the gasoline, and emitting exhaust from the chamber. Because internal combustion engines generate a lot of heat, the engines must include a cooling system to keep the engine from overheating. If the cooling system of an engine does not cool the engine sufficiently, the temperature of oil in the engine will rise and moving parts in the engine can become stuck. This is called oil caulking.

A lecture article for a mechanical engineering academic society, No. 96-1, titled "Combustion and combustion chamber of heat shield engine" was published in 1996. That article teaches that when a piston using a heat insulator, such as ceramic, is applied to a gasoline engine, the temperature of the heat insulator becomes high due to a heat accumulation effect of the heat insulator when the engine is operating at full load. The temperature of a groove portion for a piston ring, which is located within a small distance from the piston crown surface, also increases. Therefore, the piston ring can become stuck due to oil caulking. Specifically, the piston ring becomes incapable of freely moving because a portion of adhering oil is carbonized and gradually fills, or caulks, the piston ring groove.

Accordingly, a need exists for a thermally insulated engine. Specifically, there is a need for a thermally insulated engine in which the engine thermal efficiency is improved, which thereby reduces the cooling loss and prevents oil caulking.

BRIEF SUMMARY OF THE INVENTION

One advantage of the present invention is that, for example, it provides an improved piston and piston rings in an internal combustion engine that avoid sticking caused by oil caulking which thereby improves the engine's thermal efficiency and reduces the cooling loss of the engine. One exemplary embodiment of an internal combustion engine in accordance with one or more aspects of the present invention comprises an improved piston with a thermal arrangement such that heat is transferred away from the portion of the piston where oil is introduced.

In accordance with this exemplary embodiment, the piston comprises a first portion, a second portion, and a third portion. The first portion forms a crown surface of the piston, the second portion forms a piston ring groove portion of the piston with the piston ring groove arranged and configured to receive a piston ring, and the third portion forms a crankcase side surface of the piston with the crankcase side surface facing a crankcase of the engine. The second portion of the piston is formed of a material that is higher in thermal conductivity than the material that forms the first portion of the piston and the material that forms the third portion of the piston.

BRIEF DESCRIPTION OF THE SEVERAL VIEWS OF THE DRAWINGS

Various examples of objects, features and attendant advantages of an embodiment of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated. It should further be understood that the title of this section of this specification, namely, "Detailed Description of the Invention," relates to a requirement of the United States Patent Office and does not imply, nor should be inferred to limit the subject matter disclosed herein.

In the present disclosure, the words "a" or "an" are to be taken to include both the singular and the plural. Conversely, any reference to plural items, shall, where appropriate, include the singular.

Figure 1:
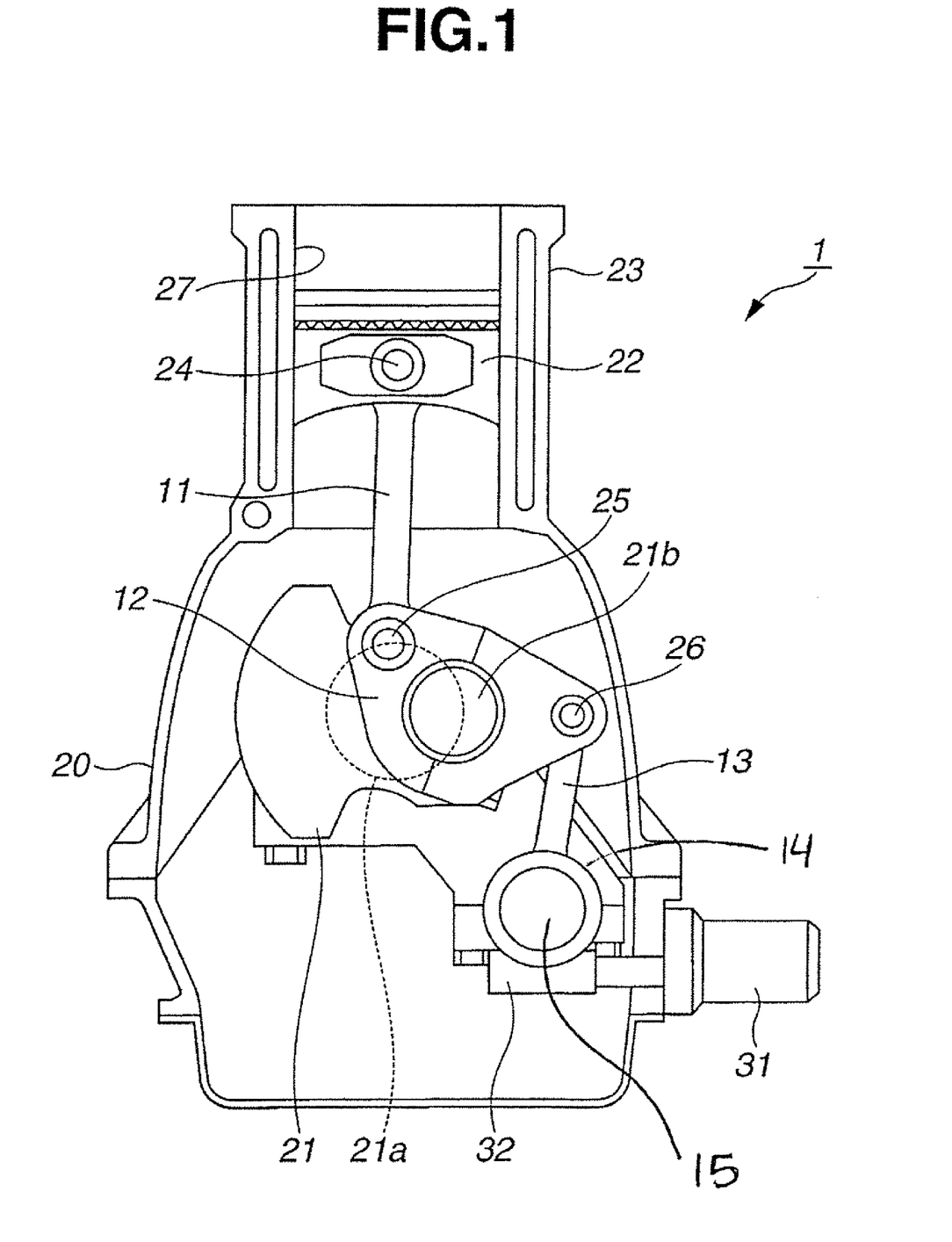
FIG. 1 shows a variable compression-ratio mechanism.

FIG. 1 shows a variable compression-ratio mechanism 1. In a broad sense, an internal combustion engine according to an embodiment of the present invention comprises, for example, an inline four-cylinder gasoline engine employing a spark-ignition system and a variable compression-ratio mechanism 1. One advantage of an embodiment of the present invention is that, for example, the variable compression-ratio mechanism 1 variably controls a compression ratio. In an exemplary embodiment of the invention, this is done by, for example, using a multilink piston stroke mechanism.

In this embodiment of the present invention, a piston 22 is slidably fit in a cylinder liner 27. The cylinder liner 27 is attached to a cylinder block 20 by fitting the cylinder liner 27 into the cylinder block 20. The piston 22 reciprocates inside a cylinder 23 by receiving a combustion pressure.

The piston 22 is connected to a crank shaft 21 through an upper first link 11 and a lower second link 12. The lower second link 12 is further connected with a control third link 13 so as to restrict the movement of the lower second link 12. The control third link 13 is further adapted to allow a rotation center of the control third link 13 to be varied by a control shaft 14. The control shaft 14 includes an eccentric shaft portion 15.

An upper end side of the upper first link 11 is rotatably connected with the piston 22 by a piston pin 24. A lower end side of the upper first link 11 is rotatably connected with one end of the lower second link 12 by a connecting pin 25.

The lower second link 12 is adapted to be divisible into two members and is formed with a connecting hole located substantially in a midsection of the lower second link 12. The crank shaft 21 includes a plurality of journals 21a and a plurality of crank pins 21b. Each journal 21a is rotatably supported by a main bearing of the cylinder block 20. The crank pin 21b is eccentric from the journal 21a by a prescribed amount and the crank pin 21b is rotatably connected with the lower second link 12. A crank pin 21b is fit into the connecting hole of the lower second link 12.

Another end of the lower second link 12 is rotatably connected with an upper end of the control third link 13 by a connecting pin 26. A lower end side of the control third link 13 is capable of rotating about the eccentric shaft portion 15 of the control shaft 14.

The control shaft 14 is rotated by a pinion 32 attached at a tip of an actuator 31. The eccentric shaft portion 15 moves in up and down directions when the control shaft 14 rotates. The control third link 13 thereby moves in up and down directions.

Figure 2A:
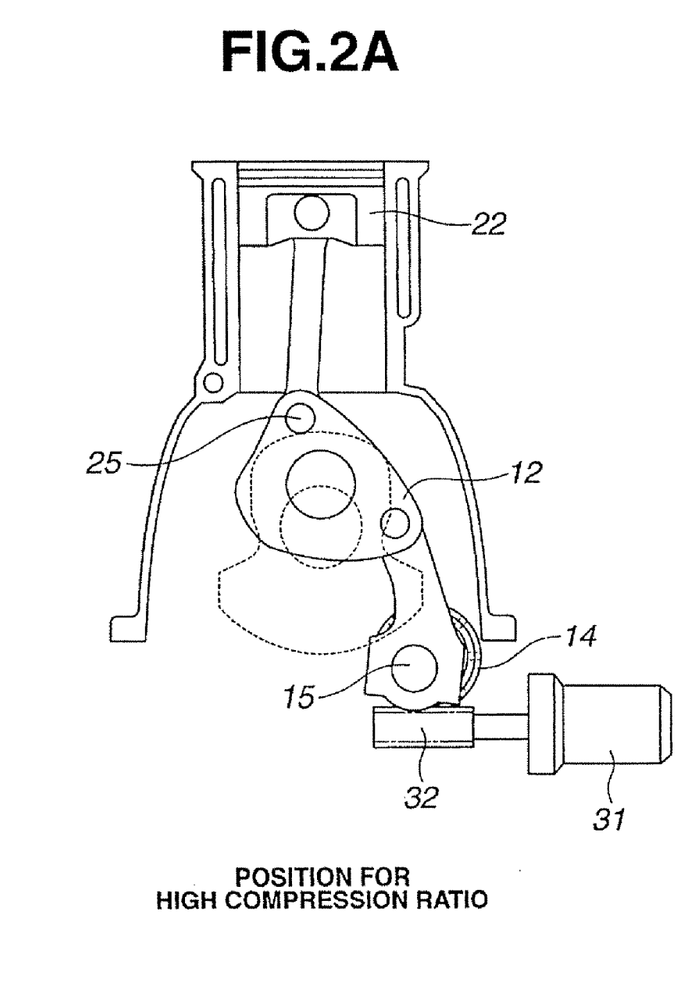
FIG. 2A and FIG. 2B show a mechanism for adjusting the stroke of a piston at the time of top dead center in the variable compression-ratio mechanism.
Figure 2B:
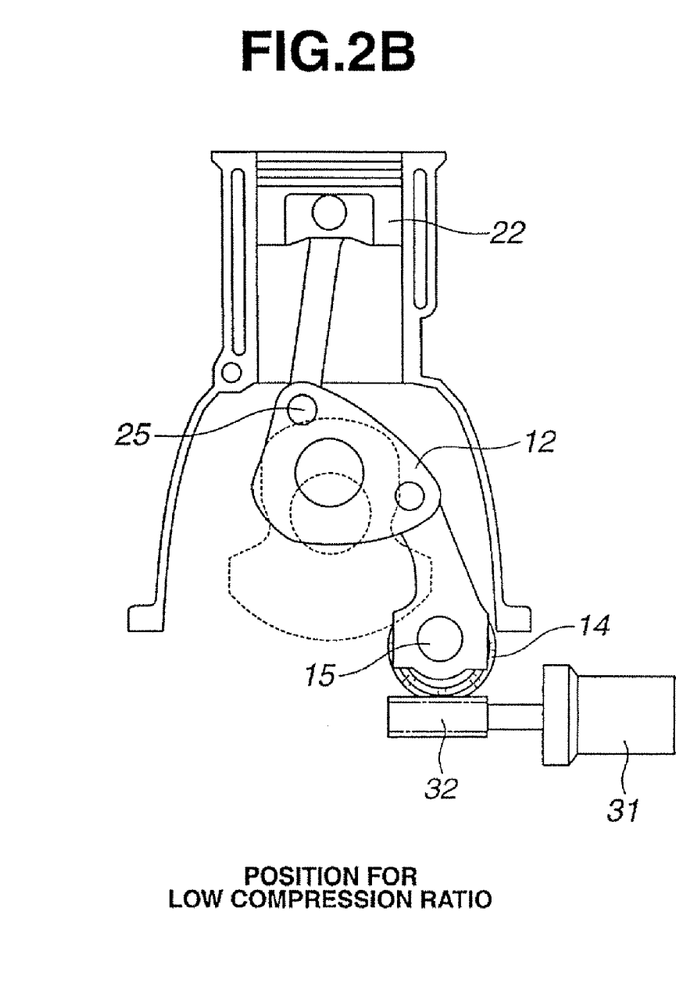

FIG. 2A and FIG. 2B show a mechanism for adjusting the stroke of a piston at the time of top dead center in the variable compression-ratio mechanism 1. FIG. 2A shows a case where the position of the piston 22 at top dead center is set for a high compression ratio. FIG. 2B shows a case where the position of the piston 22 at top dead center is set for a low compression ratio. Although FIG. 2A and FIG. 2B show the state of the piston 22 where there is a high compression ratio and where there is a low compression ratio, the compression ratio can be continuously varied between these two states.

In one embodiment of the present invention, to raise or increase the compression ratio, the actuator 31 is driven to make the eccentric shaft portion 15 of the control shaft 14 move downwardly, as shown in FIG. 2A. Thereby, the lower second link 12 moves and rotates in a clockwise direction, and the connecting pin 25 is made to move upwardly. Accordingly, the position of the piston 22 at the time of top dead center rises or becomes higher.

To lower or decrease the compression ratio, the actuator 31 is driven to make the eccentric shaft portion 15 of the control shaft 14 move upwardly, as shown in FIG. 2B. Thereby, the lower second link 12 moves and rotates in a counterclockwise direction, and the connecting pin 25 is made to move downwardly. Accordingly, the position of the piston 22 at the time of top dead center falls or becomes lower.

Figure 3:
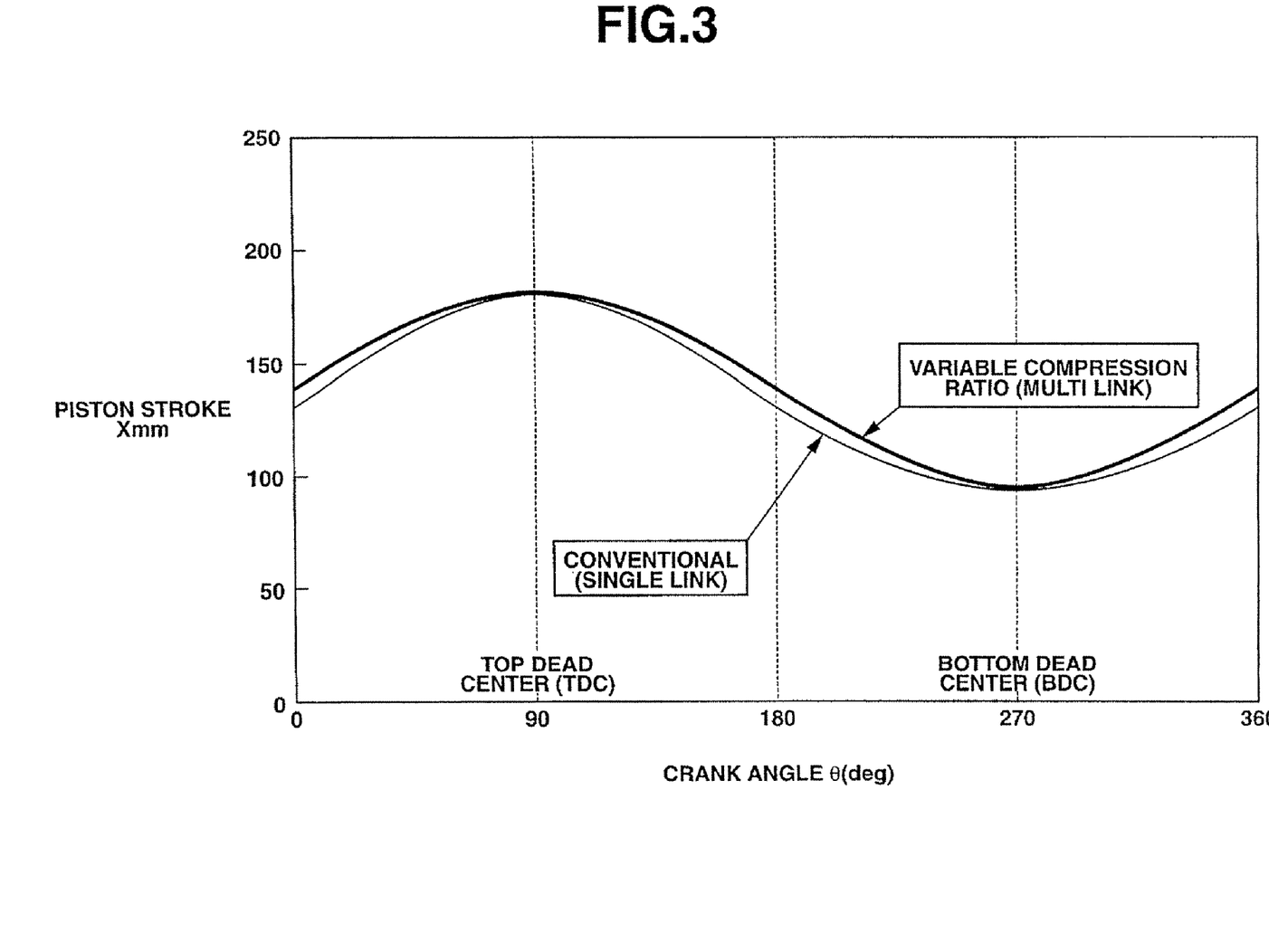
FIG. 3 is a chart that shows piston stroke characteristics obtained in a multi-link piston stroke mechanism and in a single-link piston stroke mechanism.

FIG. 3 is a chart that shows piston stroke characteristics obtained in an exemplary multi-link piston stroke mechanism and piston stroke characteristics obtained in a single-link piston stroke mechanism. An example of a multi-link piston stroke mechanism is the variable compression-ratio mechanism 1. In a conventional single-link piston stroke mechanism, a piston is connected with a crank pin of a crank shaft by a single link.

In the conventional single-link piston stroke, the piston moves quickly and has high acceleration in proximity to top dead center. The piston moves relatively slowly and has low acceleration in proximity to bottom dead center. Conversely, in the multi-link piston stroke mechanism, the movement of the piston stroke approximates to simple harmonic motion or oscillation. The simple harmonic motion of the multi-link piston stroke mechanism can be achieved by properly setting up the multi-link structure of the variable compression-ratio mechanism 1. Thus, in the multi-link piston stroke mechanism, the piston acceleration is leveled, and a piston speed in proximity to top dead center is slower than in the conventional single-link piston stroke.

In the proximity of top dead center, a scavenging, a charging, a mixture formation, and an ignition, for example, are carried out by using a high-pressure fresh air supplied from an intake valve. Because the piston speed in proximity to top dead center is reduced by the multi-link piston stroke mechanism, a rotation speed can be increased. However, when the piston speed in proximity to top dead center is lowered, a cooling loss is increased by that degree.

Figure 4:
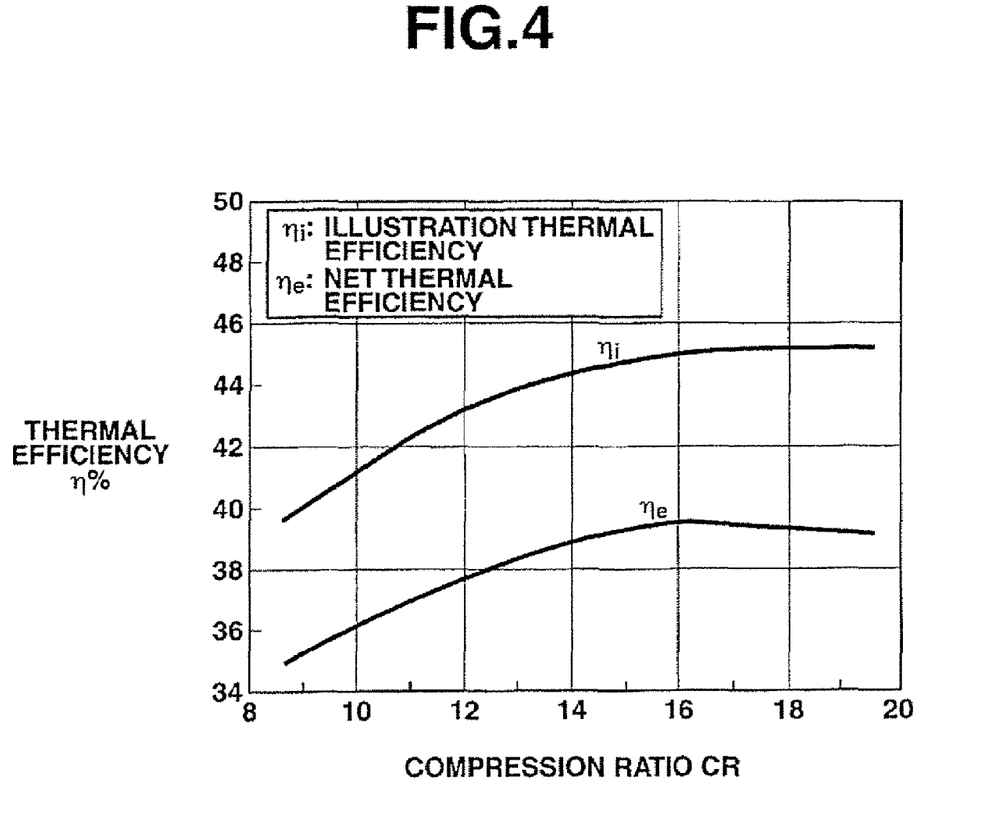
FIG. 4 is a chart that shows the relationship between compression ratio and thermal efficiency when the compression ratio is increased.

FIG. 4 is a chart that shows an exemplary relationship between compression ratio and thermal efficiency when the compression ratio is increased in a direct injection type diesel engine, which is available commercially. When there is a partial load, a knocking does not occur even if the compression ratio is set at a high value. Thus, it is desirable that the compression ratio is set at a high limit. However, when the position of the piston 22 at top dead center becomes higher as the compression ratio increases, the combustion chamber becomes flatter. Thus, an S/V ratio (surface area of combustion chamber/volume of combustion chamber) of the combustion chamber is increased when the position of the piston 22 is at top dead center. Furthermore, the cooling loss at the time of combustion is increased.

Once aspect of an embodiment of the present invention is that the thermal efficiency is enhanced as the compression ratio is made higher. An example of this aspect of an embodiment of the invention is shown in FIG. 4. However, when the compression ratio exceeds the value of approximately 16, for example, thermal efficiency can no longer be enhanced because of the increase of cooling loss caused by the flattening of the combustion chamber.

In order to (1) reduce the cooling loss caused by the flattening of the combustion chamber and a higher compression setting and (2) reduce the cooling loss caused by the reduction of the piston speed in proximity to top dead center, a wall surface of the combustion chamber is formed by a heat insulator having a low thermal conductivity and a material having a high heat accumulation ability. The wall surface is at least a part of the piston, the cylinder, the head, and the intake and exhaust valves.

In a heat-insulating engine, a heat insulator, such as ceramic, for example, is attached to the wall surface of the combustion chamber and the cooling loss is thereby reduced. The heat transfer coefficient of ceramic might rise under a high temperature condition, and the intake temperature might thus rise due to a heat transferred from the high temperature wall surface. Specifically and for example, the intake temperature at the time of compression completion might rise by more than 200° C. When such a temperature rise is caused in a gasoline engine, the occurrence of knocking becomes inevitable if the engine is operating at full load. Therefore, the compression ratio must be lowered in a conventional fixed compression-ratio mechanism.

Figure 5:
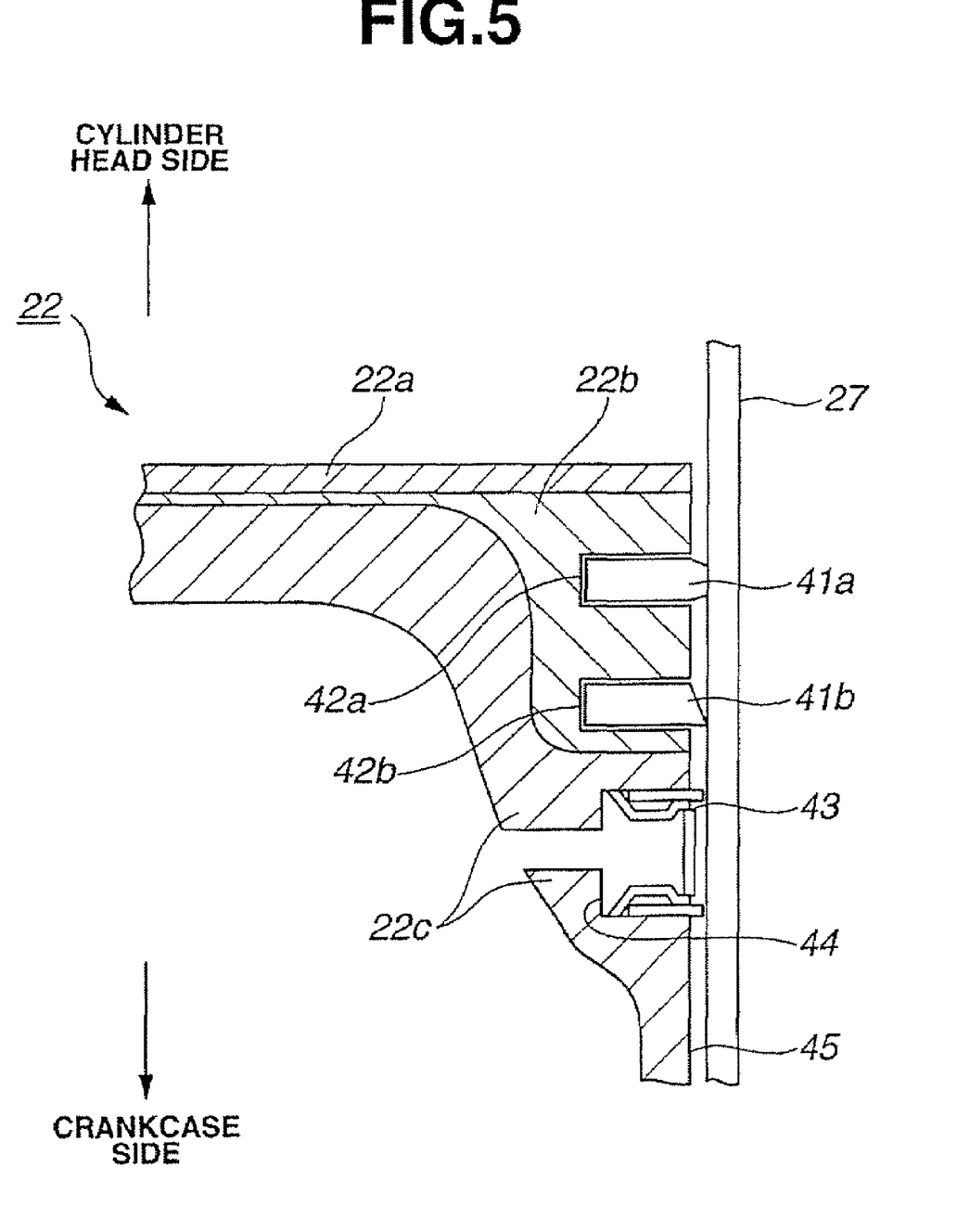
FIG. 5 shows a sectional view of the main part of a thermal insulating piston.

FIG. 5 shows a sectional view of the main part of an exemplary thermal insulating piston. The piston 22 includes a main body and a heat insulator 22a, such as ceramic, attached to a top crown surface of the main body. The heat insulator 22a has a low thermal conductivity and a high heat insulation effectiveness. The main body includes a high heat conduction material portion 22b and a nonmetal material portion 22c. The high heat conduction material portion 22b is joined to the nonmetal material portion 22c. The high heat conduction material portion 22b, such as a carbon-nanotube composite material or an aluminum alloy, for example, has higher heat conductivity than the material constituting the crown surface. The nonmetal material portion 22c, such as a carbon material or a resin material, for example, has lower heat conductivity than the high heat conduction material portion 22b and is lighter in weight than the high heat conduction material portion 22b. Accordingly, in an exemplary embodiment of the present invention, the piston 22 is constructed as a heat insulating piston having a three layer structure (heat insulator 22a, high heat conduction material portion 22b, and nonmetal material portion 22c)

The high heat conduction material portion 22b constituting the middle layer of the piston 22, is formed with piston ring groove portions 42a and 42b. Piston rings 41a and 41b are fit into the piston ring groove portions 42a and 42b, respectively, by insertion. The high heat conduction material portion 22b is further formed to be in contact with the entire surface of the heat insulator 22a on the piston main body side of the crown surface. Except for the portion of the high heat conduction material portion 22b defining the piston ring groove portions 42a and 42b, the high heat conduction material portion 22b, is constructed to be layered, or sandwiched, between the heater insulator 22a and the nonmetal material portion 22c.

The nonmetal material portion 22c includes an oil ring groove portion 44 and a skirt portion 45. The nonmetal material portion 22c includes a surface on the crankcase side of the piston main body that includes the oil ring groove portion 44. An oil ring 43 is fit into the oil ring groove portion 44 by insertion. The skirt portion 45 is formed from the oil ring groove portion 44 toward the downward reciprocating direction of the piston 22. The piston ring groove portions 42a and 42b and the oil ring groove portion 44 are formed apart from one another by prescribed distances.

The piston 22 reciprocates in contact with a cylinder liner 27, and the cylinder liner 27 is formed of a high heat conduction material. The heat conduction from the piston 22 to the crankcase side can be suppressed by the nonmetal material portion 22c. Thus, the cooling loss can be reduced without thermally insulating the cylinder liner 27 because when the cooling loss produced in proximity to top dead center reaches its maximum, the thermal efficiency can be improved.

In an exemplary embodiment of the present invention, the heat stored in the piston 22 due to the heat accumulation effect of the heat insulator 22a can be transferred to the cylinder liner 27 through the high heat conduction material portion 22b and the piston rings 41a and 41b. Thus, the sticking of the piston rings 41a and 41b can be prevented because the sticking of the piston rings 41a and 41b is caused by oil caulking. Oil caulking is caused by a rise in the temperature of the piston ring groove portions 42a and 42b located within a slight distance from the piston crown surface. The temperature of the piston ring groove portions 42a and 42b rises in response to a temperature rise of the heat insulator 22a.

Because it is possible to manage or control the temperature of the piston ring groove portions 42a and 42b, a tribological (sliding) performance similar to that of a conventional piston can be maintained. Moreover, because the oil ring groove portion 44 can be formed of the same material as the nonmetal material portion 22c (including the skirt portion 45) and because the nonmetal material portion 22c faces the crankcase side, a strength reduction near the skirt portion 45 can be avoided, and the cooling loss of the piston 22 can be reduced so the thermal efficiency can be improved. Further, because heat can be transferred from the high heat conduction material portion 22b through the piston rings 41a and 41b to the cylinder liner 27, the heat can be suppressed from being transferred to the oil ring 43. Thus, the occurrence of oil caulking can be suppressed at the oil ring 43 where the contact oil amount is large as compared with the contact oil at the piston rings 41a and 41b.

Figure 6:
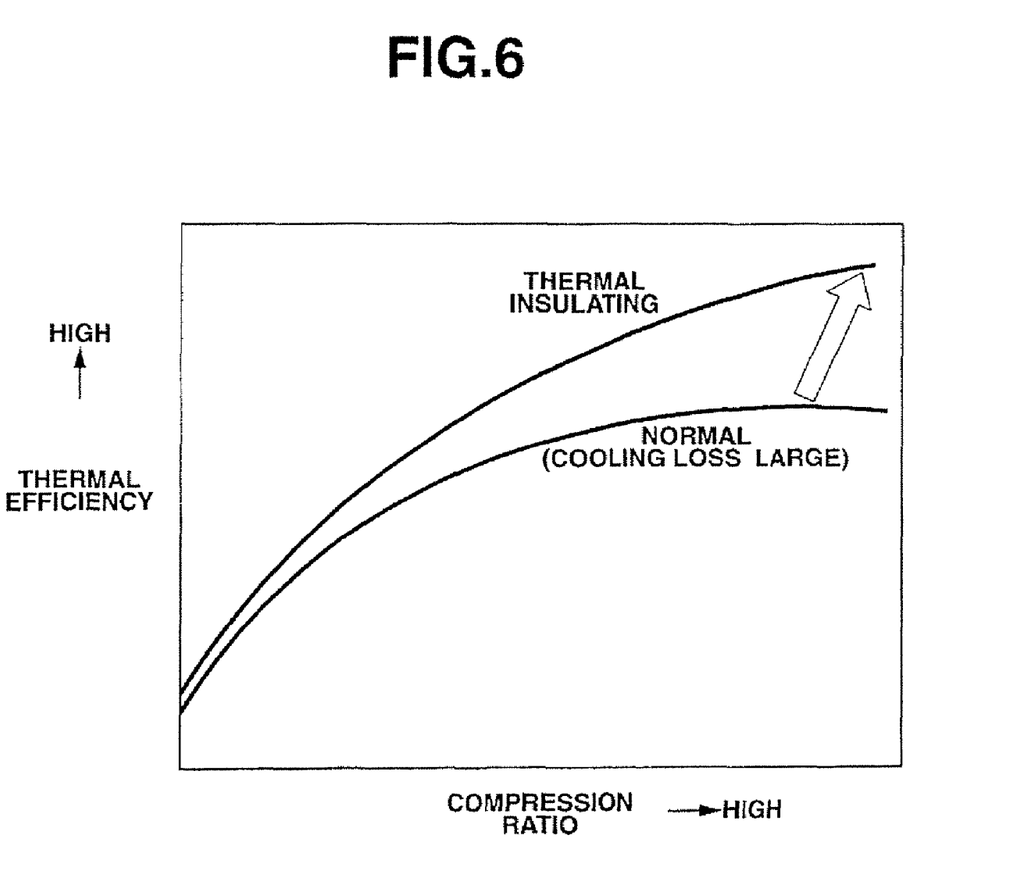
FIG. 6 is a chart that shows the change in the thermal insulation of a combustion chamber when the compression ratio is increased.

FIG. 6 is a chart that shows an exemplary change in the thermal insulation of a combustion chamber when the compression ratio is increased. As shown in FIG. 6, the insulating effect of the combustion chamber increases in the high compression ratio region. In the high compression ratio region, the cooling loss also increases.

When the compression ratio is maintained at a high value because there is a high thermal load (for example., at the time of full throttle output), knocking may occur due to the rise in intake temperature and because of the heat accumulation effect of the heat insulator 22a. Thus in accordance with another embodiment of the present invention, knocking can be avoided by lowering the compression ratio in accordance with a compression ratio control. In this embodiment of the present invention, the compression ratio control is performed by the variable compression-ratio mechanism 1, and the compression ratio control depends upon the operating conditions of the engine as depicted in FIG. 7.

Figure 7:
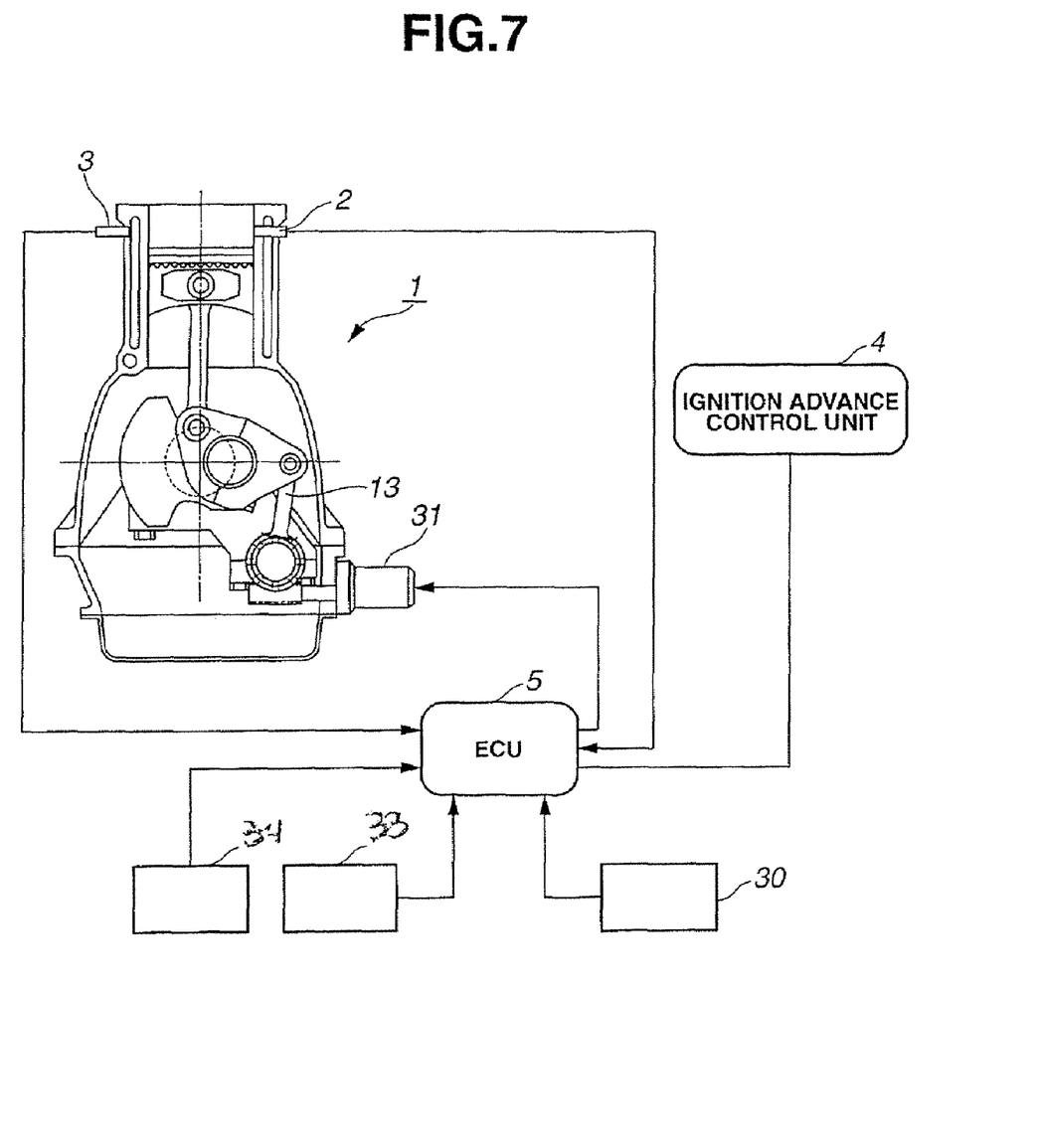
FIG. 7 shows a configuration of a control system according to an embodiment of the present invention.

FIG. 7 shows an exemplary configuration of a control system according to another embodiment of the present invention. The internal combustion engine includes the variable compression-ratio mechanism 1, a cylinder surface temperature sensor 2, a knocking sensor 3, an ignition advance control unit 4, and an engine control unit (ECU) 5. The cylinder surface temperature sensor 2 senses the temperature of the cylinder wall. The knocking sensor 3 senses any knocking. The ignition advance control unit 4 relies on a signal from the knocking sensor 3 and controls the ignition timing so as to weaken any knocking. The engine control unit 5 controls the variable compression-ratio mechanism 1 and the ignition advance control unit 4.

Figure 8A:
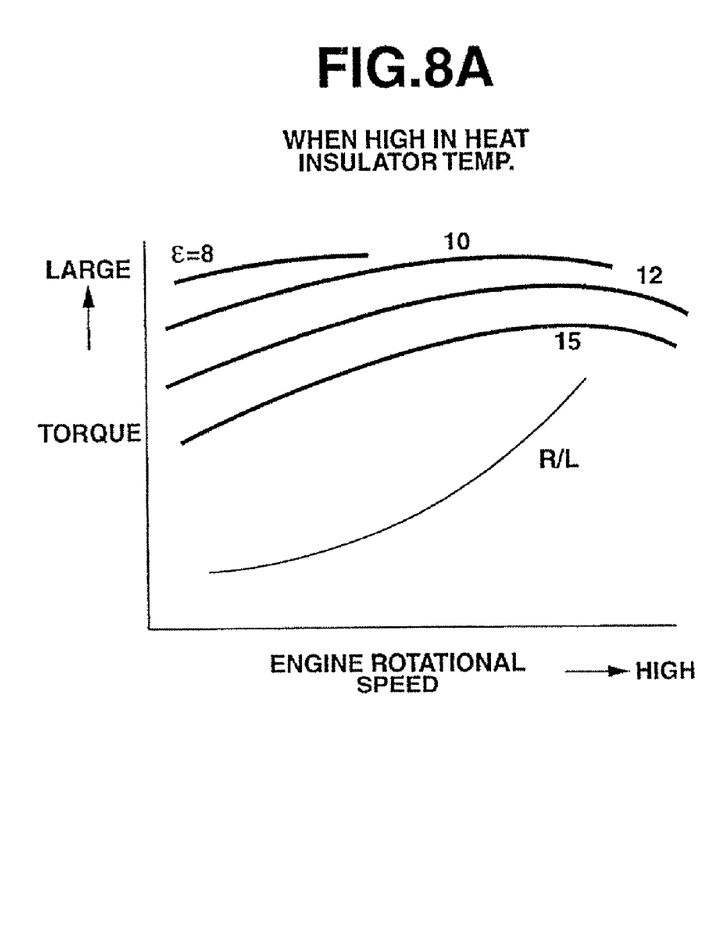
FIG. 8A and FIG. 8B are charts showing compression-ratio control characteristics in relation to varying engine operating conditions.
Figure 8B:
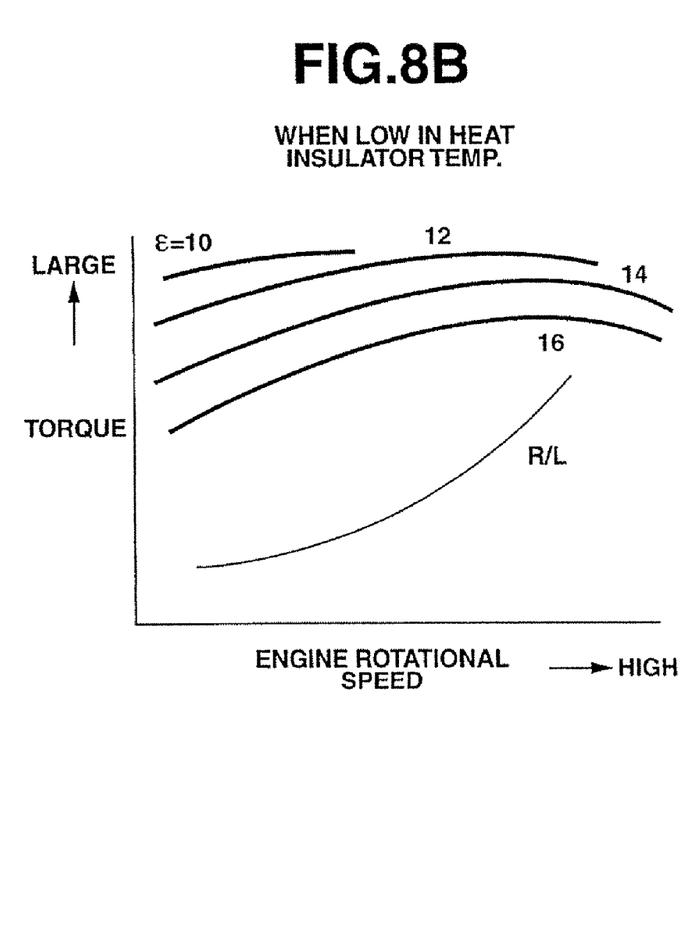

The engine control unit 5 contains a compression-ratio control map, and an exemplary compression-ratio control map is depicted in FIG. 8A and FIG. 8B. A target compression ratio is predetermined based on the operating conditions of the engine. The engine control unit 5 then controls the compression ratio in accordance with a signal from the cylinder surface temperature sensor 2. The engine control unit 5 controls the compression ratio enough in advance so that the compression ratio control is not inevitable due to the rise of intake temperature.

A signal of the engine's rotational speed and a load signal, for example, are input into the engine control unit 5 based on signals from, for example, a rotational speed sensor 30, a vehicle speed sensor 33, and an accelerator opening sensor 33.

Specifically, the engine control unit 5 controls the compression ratio of the variable compression-ratio mechanism 1 by driving an actuator 31. The actuator 31 rotates a control shaft 14, and the control shaft 14 displaces the position of a control link 13. Thus, the frequency of the operation under a high compression ratio can be increased.

FIG. 8A and FIG. 8B are charts showing exemplary compression-ratio control characteristics in relation to varying engine operating conditions in an exemplary embodiment of the present invention. Based on some engine rotational speed, the compression ratio is set. When the output of the cylinder surface temperature sensor 2 is less than or equal to a predetermined temperature, the compression ratio is set as depicted in FIG. 8B. When the output of the cylinder surface temperature sensor 2 is greater than a predetermined temperature, the compression ratio is set as depicted in FIG. 8A. Specifically, the compression ratio is set relatively higher when the output of the cylinder surface temperature sensor 2 is less than or equal to a predetermined temperature as compared to when the output of the cylinder surface temperature sensor 2 is greater than a predetermined temperature.

The target compression ratio decreases as the load increases. Further, the target compression ratio decreases as the rotation speed decreases. Specifically, the target compression ratio is set to be lower when there is a high load or when there is a low speed.

Under normal conditions where the engine has warmed Up, for example, knocking tends to occur where there is a low speed and a full load. This is because the temperature of the cylinder wall is high. Accordingly, as depicted in FIG. 8A, the compression ratio $\epsilon$ is set, for example, to 8 as a target value. As another example, where the engine has not warmed up and the temperature of cooling water is low, the compression ratio $\epsilon$ may be set at a higher value than 8 such as, for example, 10, as depicted in FIG. 8B.

Conversely, when there is a partial load such as when, for example, a vehicle is driven with an engine output power required by an R/L characteristic, knocking is not likely to occur. An example of such a partial load is a load necessary to run a vehicle on a flat road surface without acceleration or deceleration. Thus, the compression ratio is set to a higher value, up to a degree of 15, for example, so that fuel economy is improved. When the speed of the vehicle increases, knocking is not likely to occur even when there is a full load. Thus, the compression ratio is set at a relatively high value to increase the output power and enhance the thermal efficiency.

Figure 9:
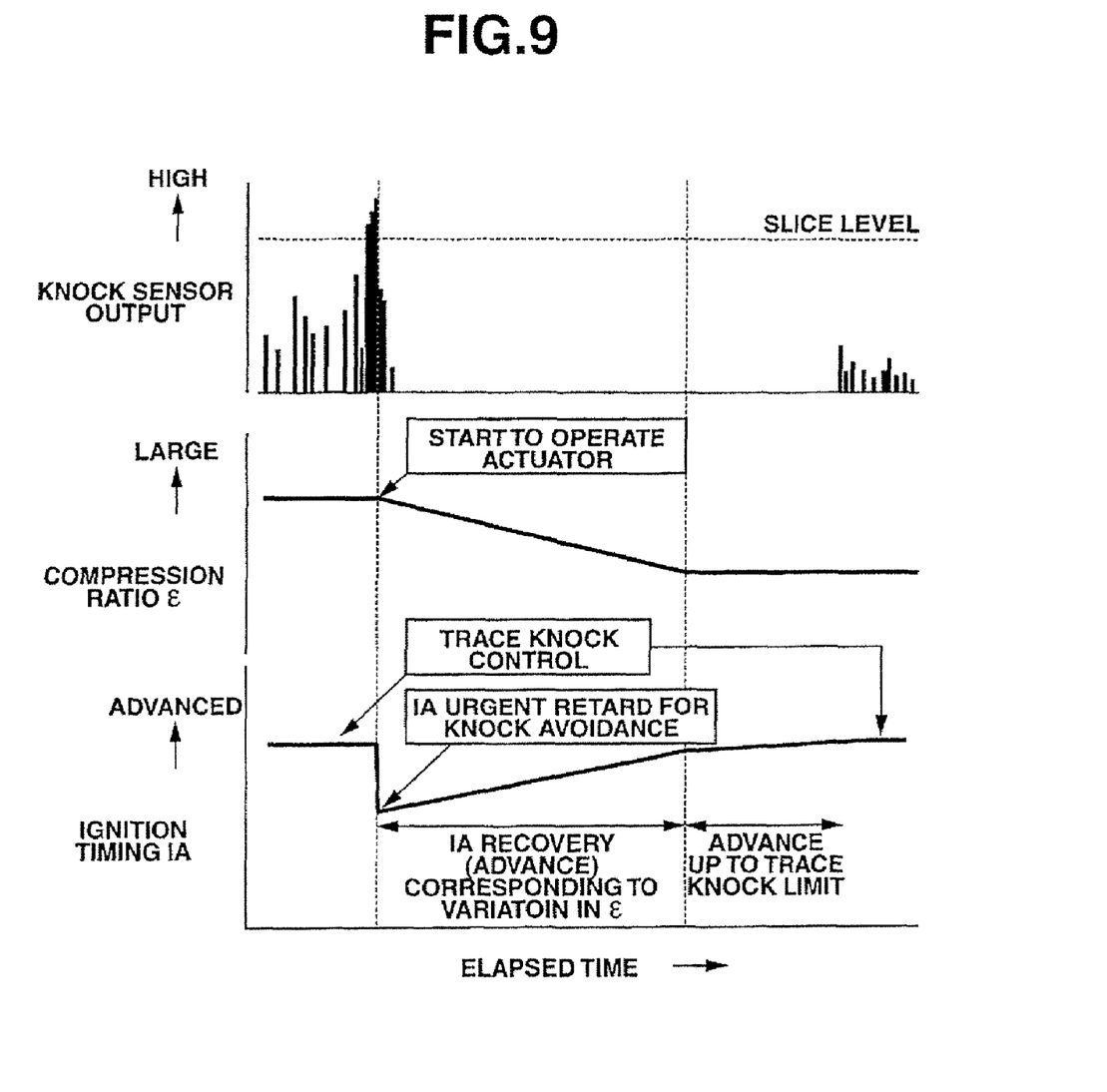
FIG. 9 is a set of charts showing transient characteristics of a compression-ratio control and of an ignition advance control when knocking occurs.

If knocking occurs even when the compression ratio is controlled in accordance with the engine operating condition, in accordance with a further embodiment of the present invention, the knocking may be limited or suppressed by controlling the ignition timing in addition to the compression ratio. FIG. 9 is a set of charts showing exemplary transient characteristics of a compression-ratio control and of an ignition advance control when knocking occurs.

The compression ratio of the variable compression-ratio mechanism 1 is reduced by the driving actuator 31 when the signal sensed by the knock sensor 3 exceeds a slice level. At the same time, the ignition advance control unit 4 promptly suppresses the knocking by retarding the ignition timing by a predetermined knock retarding amount. The ignition advance control unit 4 then gradually advances the ignition timing in response to the varying compression ratio so as to achieve weak knocking. Specifically, the ignition advance control unit 4 performs a feedback control for maintaining proper ignition timing.

Figure 10:
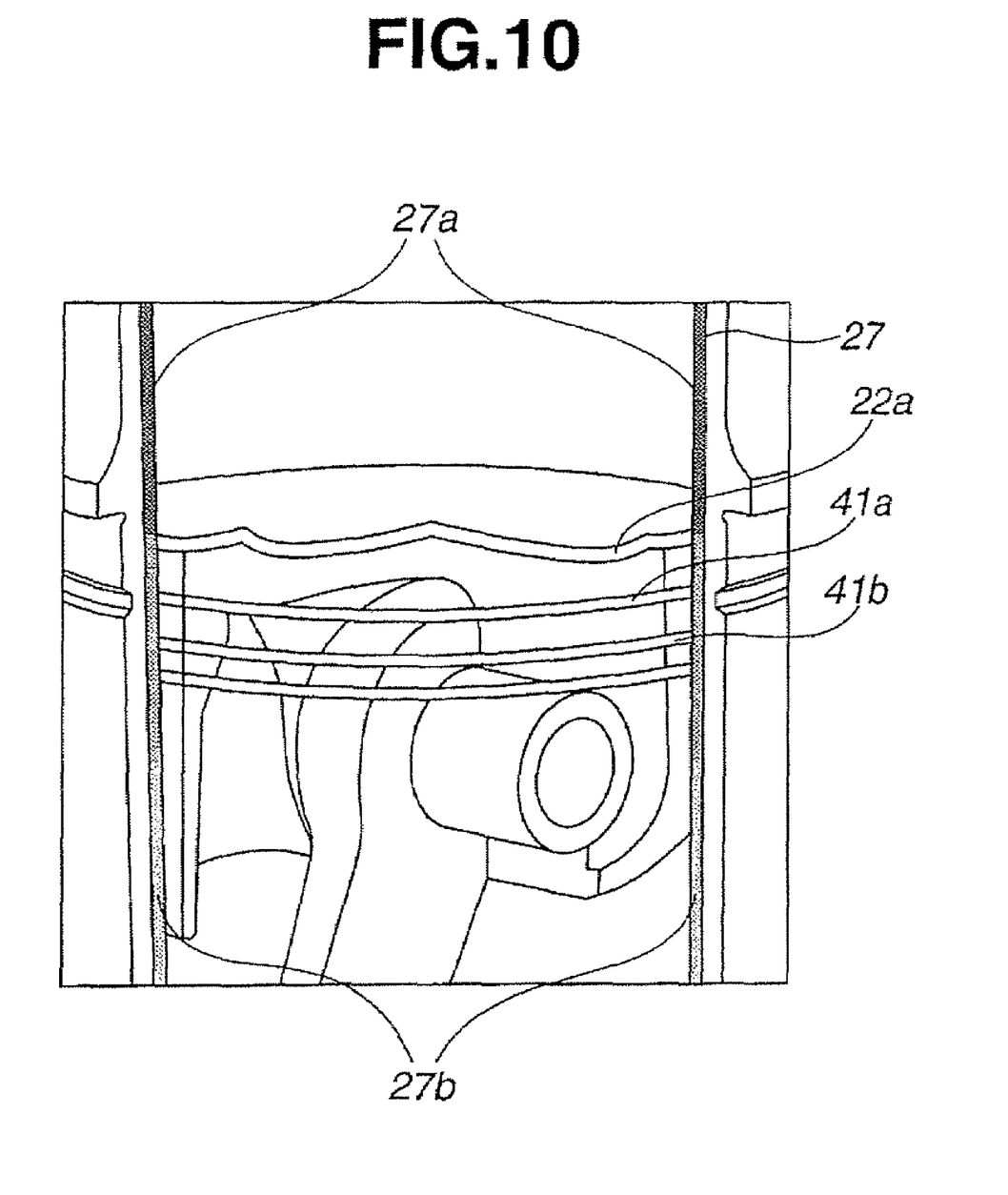
FIG. 10 shows a sectional view of a part related to a piston and a cylinder liner.

FIG. 10 shows a sectional view of a part related to a piston and a cylinder liner. In another exemplary of the present invention, a top dead center side of a cylinder liner 27 is made of a material having a high heat insulating property. A bottom dead center side of the cylinder liner 27 is made of a material having a high heat conduction property.

As depicted in FIG. 10, the top dead center side of the cylinder liner 27 is made to be a thermal insulating structure using, for example, ceramic. The bottom dead center side of the cylinder liner 27 is made by partially coating or mixing the surface of the bottom dead center side with a carbon nonotube, for example, so that the thermal conduction or transfer coefficient gradually becomes larger toward the bottom dead center. The portion of the cylinder liner 27 made of the material having a high heat insulating property (i.e. the top dead center side) is called a thermal insulating region 27a. The portion of the cylinder liner 27 made of the material having a high thermal conductivity (i.e. the bottom dead center side) is called a high thermal conducting region 27b. The cylinder liner 27 is adapted to allow the piston rings 41a and 41b to come in contact with the thermal insulating region 27a near the top dead center and to come in contact with the high thermal conduction region 27b near the bottom dead center.

In this embodiment of the present invention, a reduction in cooling loss may be further achieved at the top dead center where the thermal insulating effect is at a maximum. The cooling of the piston rings 41a and 41b may occur by promoting the heat recovery near the bottom dead center even if the surface temperature of the cylinder liner 27 rises at the top dead center side thereof. Thus, oil caulking can be further reduced, and the tribological (sliding) performance can be secured.

In all embodiments of the present invention, the piston rings 41a and 41b may be formed of a material having a thermal conductivity greater than or equal to the thermal conductivity of a material forming the piston ring groove portions 42a and 42b. Thus, the cooling performance of the piston groove can be further improved because the heat transfer performance from the piston 22 to the piston rings 41a and 41b is further improved.

Here, the embodiments explained above are given in order to facilitate an understanding of the technical idea of the present invention. They do not restrict the present invention in any way. Therefore, the respective elements disclosed in the aforementioned embodiments are intended to include all design modifications and their equivalents that belong to the technical scope of the present invention.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A piston adapted to reciprocate in a cylinder of an internal combustion engine, comprising:
   a first portion formed at least in part of a first material with the first portion forming a crown surface of the piston;
   a second portion formed at least in part of a second material with the second portion forming a piston ring groove of the piston, the piston ring groove being arranged and configured to receive a piston ring; and
   a third portion formed at least in part of a third material with the third portion forming a crankcase side surface of the piston, the crankcase side surface facing a crankcase of the engine,
   the second portion being directly sandwiched between the first and third portions to form a three layer structure in an axial direction of the piston with the second material of the second portion having a higher thermal conductivity than that of the first and third materials of the first and third portions.

2. The piston in accordance with claim 1, wherein the first portion is joined to the third portion with the second portion sandwiched therebetween.

3. The piston in accordance with claim 1, wherein the third material is lighter in weight than the second material.

4. The piston in accordance with claim 1, wherein the third material is a non-metallic material.

5. The piston in accordance with claim 1, wherein the entirety of the third portion of the piston is formed of the third material.

6. The piston in accordance with claim 1, wherein the third portion is formed with an oil ring groove configured and arranged to receive an oil ring.

7. An internal combustion engine, comprising:
a cylinder block having a cylinder with a top dead center side portion of the cylinder is formed of a top dead center material having a lower thermal conductivity than a bottom dead center material forming a bottom dead center side portion of the cylinder; and
a piston as set forth in claim 1.

8. The internal combustion engine in accordance with claim 7, wherein
the piston adapted to reciprocate in the cylinder is configured and arranged such that the piston ring is in contact with the bottom dead center material of the cylinder at a bottom dead center position of the piston.

9. The piston in accordance with claim 1, wherein the second material forming the piston ring groove has a thermal conductivity lower than or equal to that of the piston ring received therein.

10. An internal combustion engine, comprising:
a variable compression-ratio mechanism adapted to vary an engine compression ratio on the basis of an operating condition of the internal combustion engine, the compression ratio being reduced during low speed and high load operating condition as compared to that during high speed and low load operating condition, and
a piston as set forth in claim 1.

11. The internal combustion engine in accordance with claim 10, further comprising
a knocking sensor, the compression ratio being controlled to reduce when a signal from the knocking sensor is greater than or equal to a predetermined value.

12. The internal combustion engine in accordance with claim 10, wherein
the variable compression-ratio mechanism further includes:
a first link having one end connected with a piston pin of the piston;
a second link having one end connected with a second end of the first link, the second link being rotatably mounted on a crank shaft;
a third link having one end connected with a second end of the second link; and
a control shaft having an eccentric shaft portion eccentric from a rotational center axis of the control shaft, the eccentric shaft portion being rotatably connected with a second end of the third link,
the compression ratio being varied by rotating the control shaft based on the operating condition of the internal combustion engine with moving the eccentric shaft portion in up and down directions and varying a top dead center position of the piston.

13. The internal combustion engine in accordance with claim 12, wherein
a link configuration of the first link, the second link, and the third link causes a stroke characteristic of the piston to be substantially simple harmonic motion.

14. An internal combustion engine, comprising:
a piston adapted to reciprocate in a cylinder, the piston having a first portion that forms a crown surface of the piston, a second portion that at least forms a piston ring groove adapted to receive a piston ring, a third portion that forms a crankcase side surface of the piston,
the second portion being directly sandwiched between the first and third portions to form a three layer structure in an axial direction of the piston, the second portion being formed of a second material that has a thermal conductivity higher than a first material forming the first portion and a third material forming the third portion.

* * * * *